(12) United States Patent
Hirano et al.

(10) Patent No.: US 8,770,332 B2
(45) Date of Patent: Jul. 8, 2014

(54) MOTORCYCLE AND VEHICLE BODY FRAME

(71) Applicant: Yamaha Hatsudoki Kabushiki Kaisha, Shizuoka (JP)

(72) Inventors: Akinori Hirano, Shizuoka (JP); Takehisa Katsura, Shizuoka (JP); Katsutoshi Satoh, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 0 days.

(21) Appl. No.: 13/657,202

(22) Filed: Oct. 22, 2012

(65) Prior Publication Data

US 2013/0098701 A1     Apr. 25, 2013

(30) Foreign Application Priority Data

Oct. 24, 2011   (JP) ................... 2011-233108

(51) Int. Cl.
*B62K 11/04*   (2006.01)

(52) U.S. Cl.
CPC ........................... *B62K 11/04* (2013.01)
USPC ........................ 180/227; 180/219; 403/362

(58) Field of Classification Search
CPC ........ B62K 19/00; B62K 19/18; B62K 19/24; B62K 19/28
USPC ............... 180/218, 219, 227, 228, 299, 311; 280/287, 278, 299, 302, 274, 281.1, 280/781, 785, 295; 403/362, 359.5, 376
See application file for complete search history.

(56) References Cited

U.S. PATENT DOCUMENTS

| | | | |
|---|---|---|---|
| 5,704,442 A * | 1/1998 | Okazaki et al. | 180/219 |
| 6,846,018 B2 * | 1/2005 | Dennert et al. | 280/785 |
| 2008/0223648 A1 * | 9/2008 | Shiraishi | 180/312 |

FOREIGN PATENT DOCUMENTS

| | | |
|---|---|---|
| JP | 04-011590 A | 1/1992 |
| JP | 04-244492 A | 9/1992 |
| JP | 2002-087366 A | 3/2002 |
| JP | 2004-067078 A | 3/2004 |
| JP | 2005-067507 A | 3/2005 |
| JP | 2007-091113 A | 4/2007 |
| JP | 2008-222077 A | 9/2008 |

* cited by examiner

*Primary Examiner* — Joseph M Rocca
*Assistant Examiner* — Jacob Knutson
(74) *Attorney, Agent, or Firm* — Rabin & Berdo, P.C.

(57) ABSTRACT

A vehicle body frame includes an upper frame, lower frame and a fastening member. The fastening member includes first and second bolts. The first bolt is provided to obliquely cross an axial line of a lower frame end connected to an upper frame end and to fasten the lower frame end to the upper frame end. The second bolt is provided to orthogonally cross the axial line of the lower frame end and fasten the lower frame end to the upper frame end.

18 Claims, 11 Drawing Sheets

MOTORCYCLE AND VEHICLE BODY FRAME

CROSS-REFERENCE TO RELATED APPLICATION

This application is based on, and claims priority to, Japanese Patent Application No. 2011-233108, filed on Oct. 24, 2011, the contents of which are incorporated herein by reference.

BACKGROUND

1. Technical Field

The present invention relates to a motorcycle and a vehicle body frame for use in a motorcycle.

2. Description of the Background Art

A vehicle body frame for use in a motorcycle has a loop shape and stores an engine inside. The vehicle body frame is generally produced as an integral form. When a motorcycle is produced, an engine is stored in the vehicle body frame. Therefore, the vehicle body frame is larger than the engine.

If a vehicle body frame is too large, operational feeling about the motorcycle is degraded. If the vehicle body frame is small, the weight of the motorcycle is reduced, and the vehicle body frame as a whole is positioned in the vicinity of the center of gravity of the motorcycle. Therefore, good operational feeling is obtained. Therefore, smaller vehicle body frames are preferable.

Furthermore, a vehicle body frame must have balanced rigidity (stiffness). If the motorcycle is an off-road type vehicle such as a motocrosser in particular, the motorcycle travels off-road or jumps. Therefore, external force in various directions is applied on the vehicle body frame. If the rigidity greatly varies against external force in various directions, operational feeling is degraded. If for example the torsional rigidity is extremely small as compared to the tensile rigidity and compression stiffness, the vehicle body frame is likely to flex against force in a torsional direction. Therefore, if force is applied in a torsional direction, the vehicle body frame flexes more than usual. This makes the motorcycle less maneuverable. In this way, if the rigidity against external force in various directions is greatly unbalanced, operational feeling is degraded. Therefore, it is preferable to reduce unbalance in rigidity against different kinds of external force.

The disclosure of JP-A 2008-222077 and the disclosure of JP-A 4-244492 suggest a vehicle body frame that allows rigidity and strength to be secured. The vehicle body frames disclosed by JP-A 2008-222077 and JP-A 4-244492 are partly detachable. By selecting a material for the detachable frame part, sufficient strength and rigidity can be secured for the vehicle body frame.

SUMMARY

In each of the vehicle body frames disclosed by JP-A 2008-222077 and JP-A 4-244492, however, rigidity against various kinds of external force would greatly vary at a connecting part between the detachable frame and the rest of the vehicle body frame. Therefore, good operational feeling is unlikely to be obtained.

It is an object of the present invention to provide a motorcycle that allows good operational feeling to be easily obtained.

A motorcycle according to some embodiments of the invention includes an engine and a vehicle body frame provided around the engine. The vehicle body frame includes an upper frame that includes a head pipe, a main frame that extends backward and obliquely downward from the head pipe, and a front frame that extends downward from the head pipe. The upper frame has a first upper frame end that is a lower end of the front frame and a second upper frame end that is a lower end of the main frame. The vehicle body frame also includes a lower frame provided between the first upper frame end and the second upper frame end. The lower frame includes a first lower frame end connected to the first upper frame end and a second lower frame end connected to the second upper frame end. The vehicle body frame includes a first fastening member that fastens a joined upper frame end of the upper frame and a joined lower frame end of the lower frame. The joined upper frame and lower frame ends are one of the first lower frame end and the first upper frame end, and the second lower frame end and the second upper frame end. The first fastening member includes a first bolt provided to obliquely cross a first axial line of the joined lower frame end, and to fasten the joined lower frame end to the joined upper frame end. The first fastening member further includes a second bolt provided to orthogonally cross the first axial line and to fasten the joined lower frame end to the joined upper frame end.

In the motorcycle according to the embodiment, the vehicle body frame can be divided into the upper frame and the lower frame. Therefore, the vehicle body frame as a whole can be smaller than a conventional frame. Furthermore, at a fastened portion for the upper frame and the lower frame, rigidity unbalance against external force applied in various directions can be reduced using the first fastening member. Therefore, good operational feeling is readily obtained.

DESCRIPTION OF THE EMBODIMENTS

Figure 1:
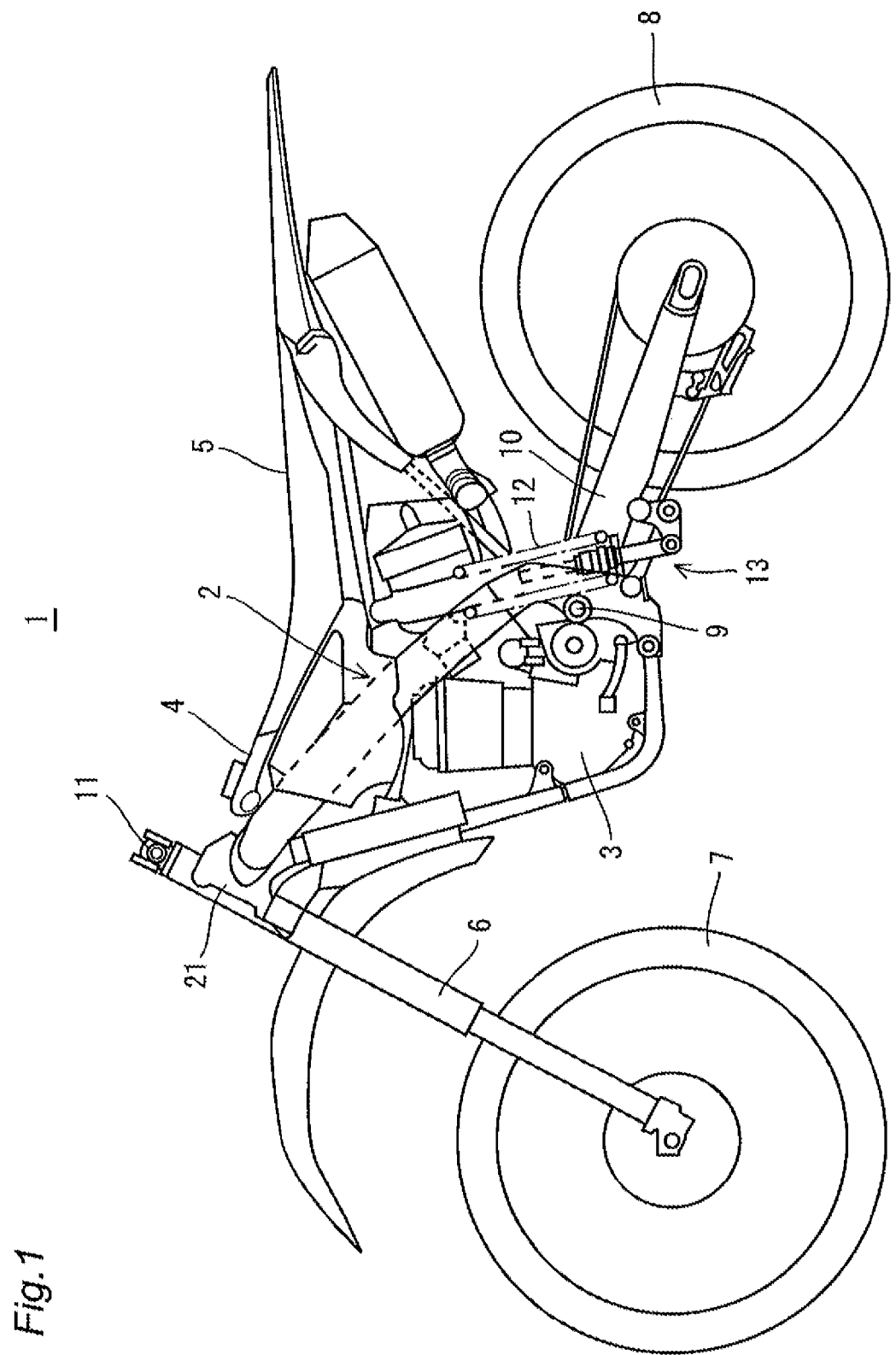
FIG. 1 is a left side view of a motorcycle according to some embodiments of the present invention.

Now, an embodiment of the present invention will be described in detail in conjunction with the accompanying drawings. In the drawings, the same or corresponding portions are designated by the same reference characters and their description will not be repeated. In the following description, the front, rear, left, and right refer to these directions as viewed from a rider seated on the seat.

Overall Structure of Motorcycle

FIG. 1 is a left side view of a motorcycle 1. Referring to FIG. 1, the motorcycle 1 includes a vehicle body frame 2, an engine 3, a fuel tank 4, a seat 5, a front fork 6, a front wheel 7, a rear wheel 8, a rear shock absorber 12, and a link mechanism 13.

The vehicle body frame 2 includes a head pipe 21 at a front end. The head pipe 21 is a tube that extends downward and obliquely forward. A handle 11 is rotatably attached to an upper part of the head pipe 21. A pair of front forks 6 is provided on the left and right sides of the head pipe 21. The pair of front forks 6 extends downward and obliquely forward. The front wheel 7 is attached to the lower ends of the pair of front forks 6 in a rotatable manner. The fuel tank 4 is provided above a front part of the vehicle body frame 2. The seat 5 is provided above the vehicle body frame 2 and extends backward from an upper end of a rear part of the fuel tank 4.

The vehicle body frame 2 is a so-called cradle type frame and loop-shaped. The engine 3 is stored in the vehicle body frame 2. A pivot shaft 9 is provided at a rear part of the vehicle body frame 2. A rear arm 10 is supported at its front end around the pivot shaft 9 so that it can swing up and down. The rear wheel 8 is attached rotatably at a rear end of the rear arm 10.

The rear shock absorber 12 is provided behind the vehicle body frame 2 and under the seat 5. The rear shock absorber 12 has its upper end attached to a bracket formed at an upper part of the vehicle body frame 2. The rear shock absorber 12 has a lower end attached to the link mechanism 13. The link mechanism 13 is attached to the rear arm 10 and a lower rear end of the vehicle body frame 2. The rear arm 10 is attached so that it can swing up and down.

Structure of Vehicle Body Frame 2

Figure 2:
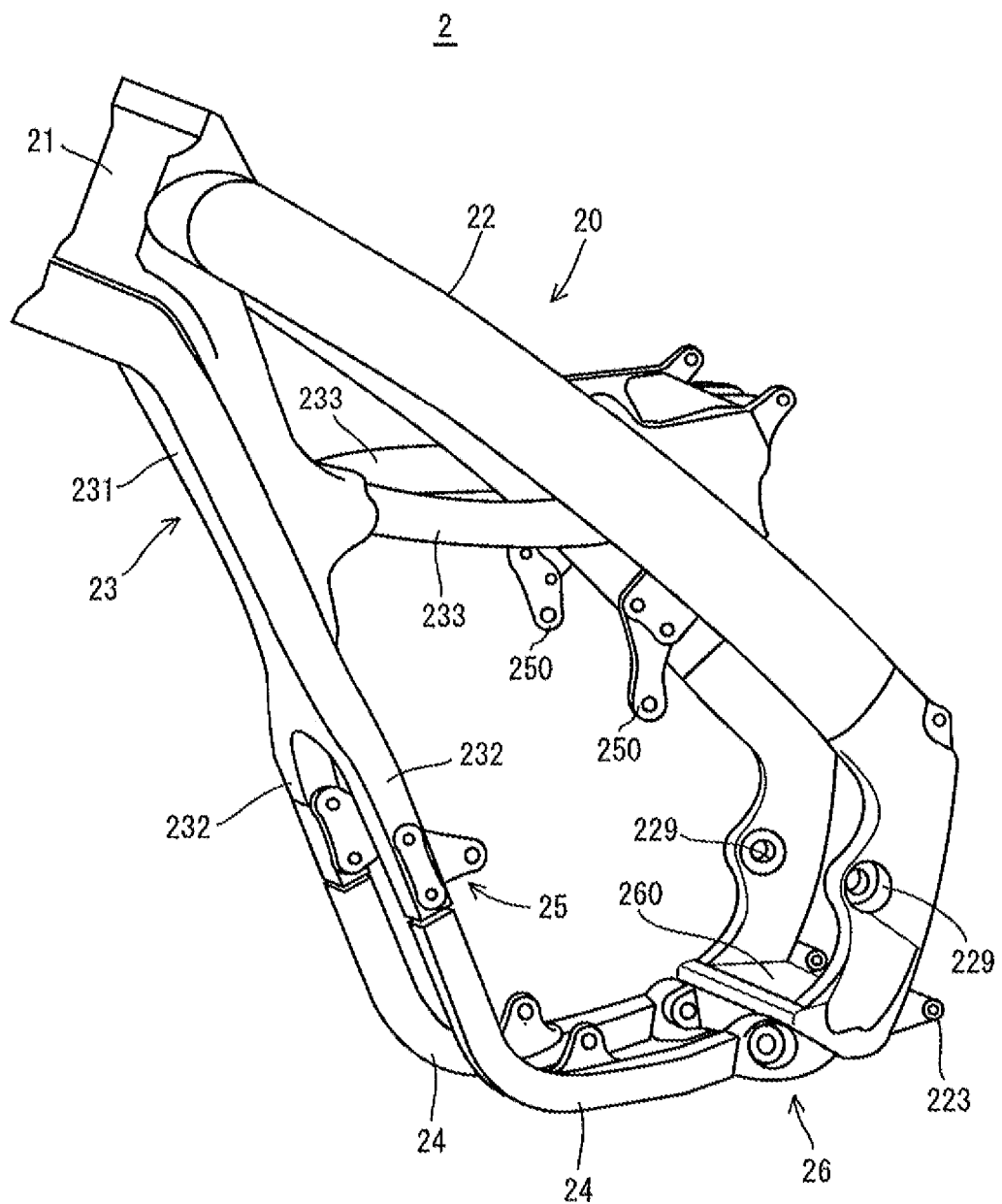
FIG. 2 is a perspective view of a vehicle body frame shown in FIG. 1.
Figure 3:
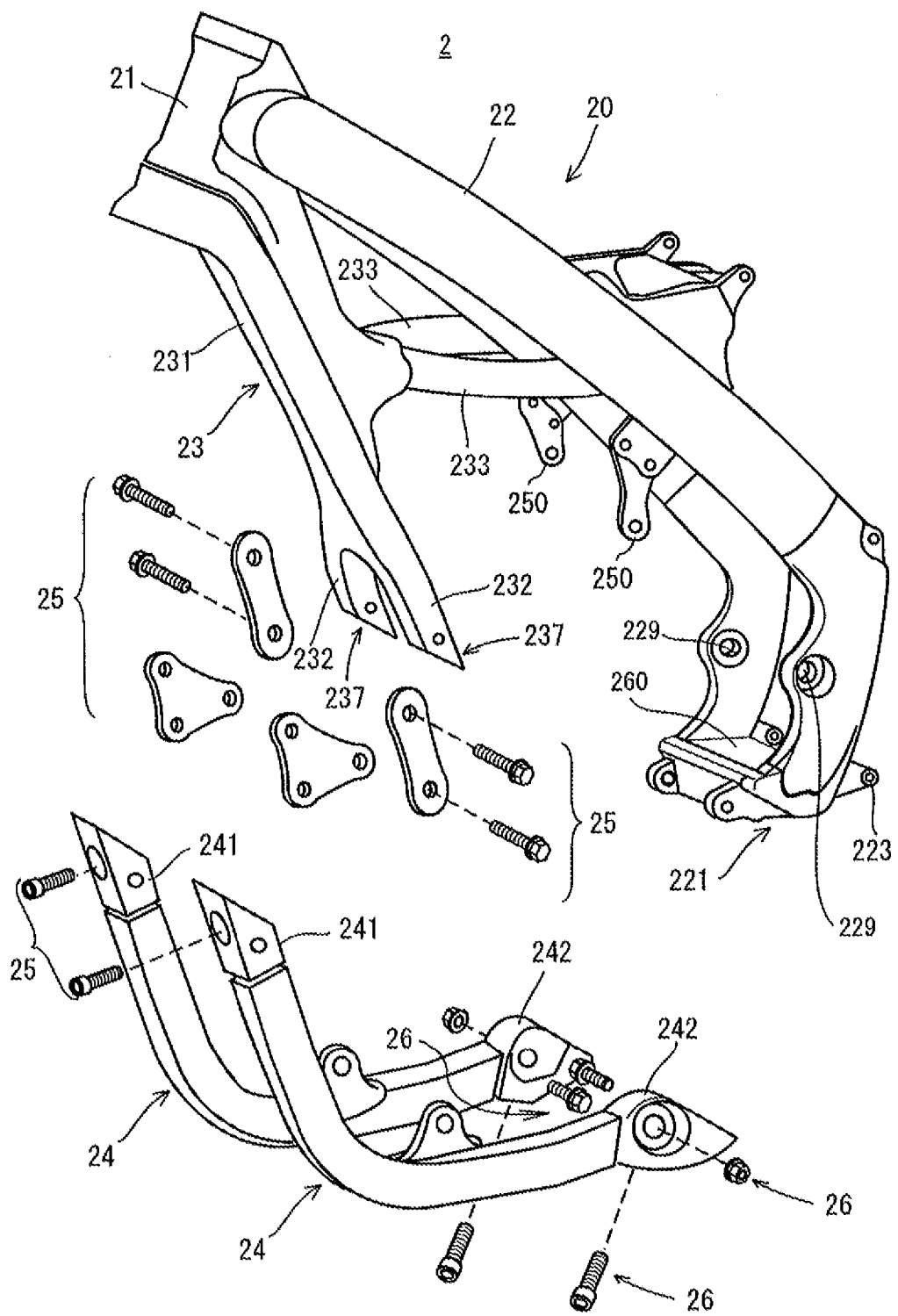
FIG. 3 is an exploded perspective view of the vehicle body frame shown in FIG. 1.

FIG. 2 is a perspective view of the vehicle body frame 2. FIG. 3 is an exploded perspective view of the vehicle body frame 2. Referring to FIGS. 2 and 3, the vehicle body frame 2 includes an upper frame 20, a pair of lower frames 24, and fastening members 25 and 26. The fastening members 25 and 26 fasten the lower frames 24 to the upper frame 20.

Structure of Upper Frame 20

The upper frame 20 includes a head pipe 21, a pair of main frames 22, and a front frame 23. Front ends of the pair of main frames are connected to a rear part of the head pipe 21. The pair of main frames 22 extends obliquely downward and toward the back of the motorcycle 1 from the head pipe 21. The main frames 22 are provided as they are aligned in the widthwise direction of the motorcycle 1. A pair of trough holes 229 is provided at lower ends of the pair of main frames 22. The pivot shaft 9 (see FIG. 1) is inserted in the pair of through holes 229.

The pair of main frames 22 includes ends 221 at their lower ends. The ends 221 are attached with the lower frames 24. The end 221 is an end of the upper frame 20, and therefore will be referred to as the "upper frame end 221" in the following description.

A tubular cross frame 260 is provided between the pair of upper frame ends 221. The cross frame 260 includes a pair of attachment members 223. The attachment members 223 are provided apart from each other in the widthwise direction at the lower end of the cross frame 260. A front end of the link mechanism 13 (see FIG. 1) is provided between the pair of attachment members 223 and the pair of attachment members 223 is connected with the link mechanism 13 by a shaft.

An upper end of the front frame 23 is connected to a lower end of the head pipe 21. The front frame 23 extends downward from the head pipe 21. The front frame 23 includes a trunk frame 231 and a pair of branch frames 232. The trunk frame 231 is provided above the front frame 23 and an upper end of the trunk frame 231 is connected to the head pipe 21. The pair of branch frames 232 is provided under the front frame 23. The pair of branch frames 232 is arranged in the widthwise direction of the motorcycle 1 and an upper end of each of the branch frames 232 is connected to a lower end of the trunk frame 231. Each of the branch frames 232 includes an end 237 at the lower end. A lower frame 24 is attached to the end 237. The end 237 is an end of the upper frame 20 and therefore will be referred to as the "upper frame end 237" in the following description.

The front frame 23 further includes a pair of beam members 233. The pair of beam members 233 is attached between a rear end of the trunk frame 231 and the pair of main frames 22. The beam members 233 serve to reduce welding distortion that could be caused when the items are separate before being connected with bolts.

Lower Frame 24

The lower frame 24 is provided between the upper frame end 237 and the upper frame end 221.

The lower frame 24 extends in a front-back direction of the motorcycle 1 and its front end extends upward. The lower frame 24 has two lower frame ends 241 and 242. The lower frame end 241 is provided at a front end of the lower frame 24 and extends upward. The lower frame end 242 is provided at a rear end of the lower frame 24 and extends backward.

The lower frame end 241 is attached to the upper frame end 237. The lower frame end 242 is attached to the upper frame end 221.

Fastening Members 25 and 26

The fastening member 25 fastens the lower frame end 241 to the upper frame end 237. The fastening member 26 fastens the lower frame end 242 to the upper frame end 221. Hereinafter, in the vehicle body frame 2, a part fastened by the fastening member 25 will be referred to as the "front fastened portion" and a part fastened by the fastening member 26 will be referred to as the "rear fastened portion."

Positioning of Engine 3 in Vehicle Body Frame 2

As described above, the vehicle body frame 2 is divided into the upper frame 20 and the lower frames 24. When an engine is stored in an integrally formed vehicle body frame, the vehicle body frame is large enough to insert the engine inside.

Figure 4:
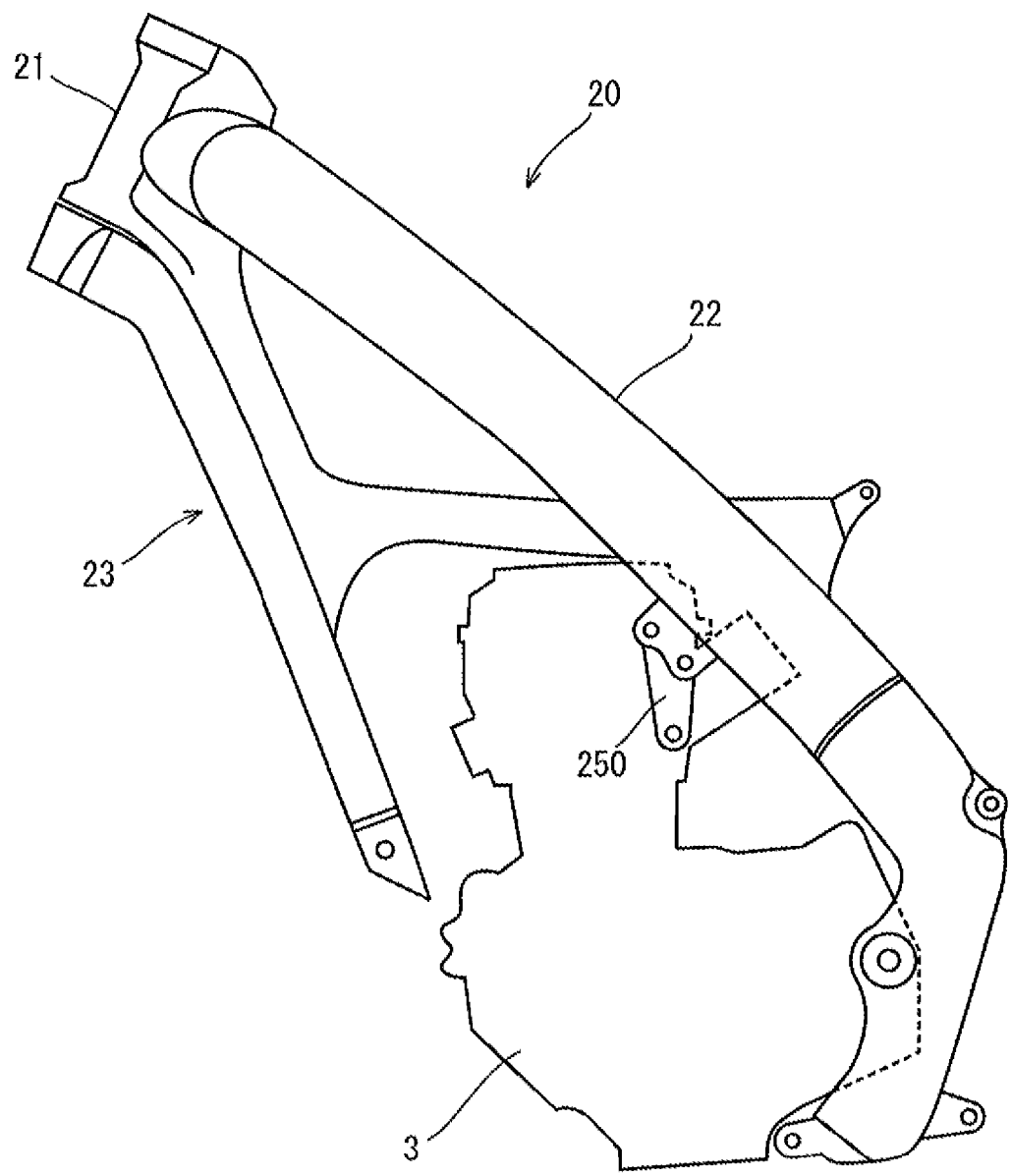
FIG. 4 is a side view of an upper frame and an engine shown in FIG. 1.

On the other hand, the vehicle body frame 2 can be smaller than the conventional integrally formed vehicle body frame. As described above, the vehicle body frame 2 is divided into the upper frame 20 and the lower frame 24. As shown in FIG. 4, when the engine 3 is stored in the vehicle body frame 2, the engine 3 is attached to the upper frame 20. More specifically, the engine 3 is attached to a bracket 250 that extends downward from the main frame 22. At the time, the lower frame 24 is not attached to the upper frame 20, and therefore the engine 3 can be attached easily to the upper frame 20. A part of a rear end of the engine 3 attached to the upper frame 20 is provided between the pair of main frames 22. Therefore, the main frame 22 has a part that overlaps the engine 3 in a side view.

Figure 5:
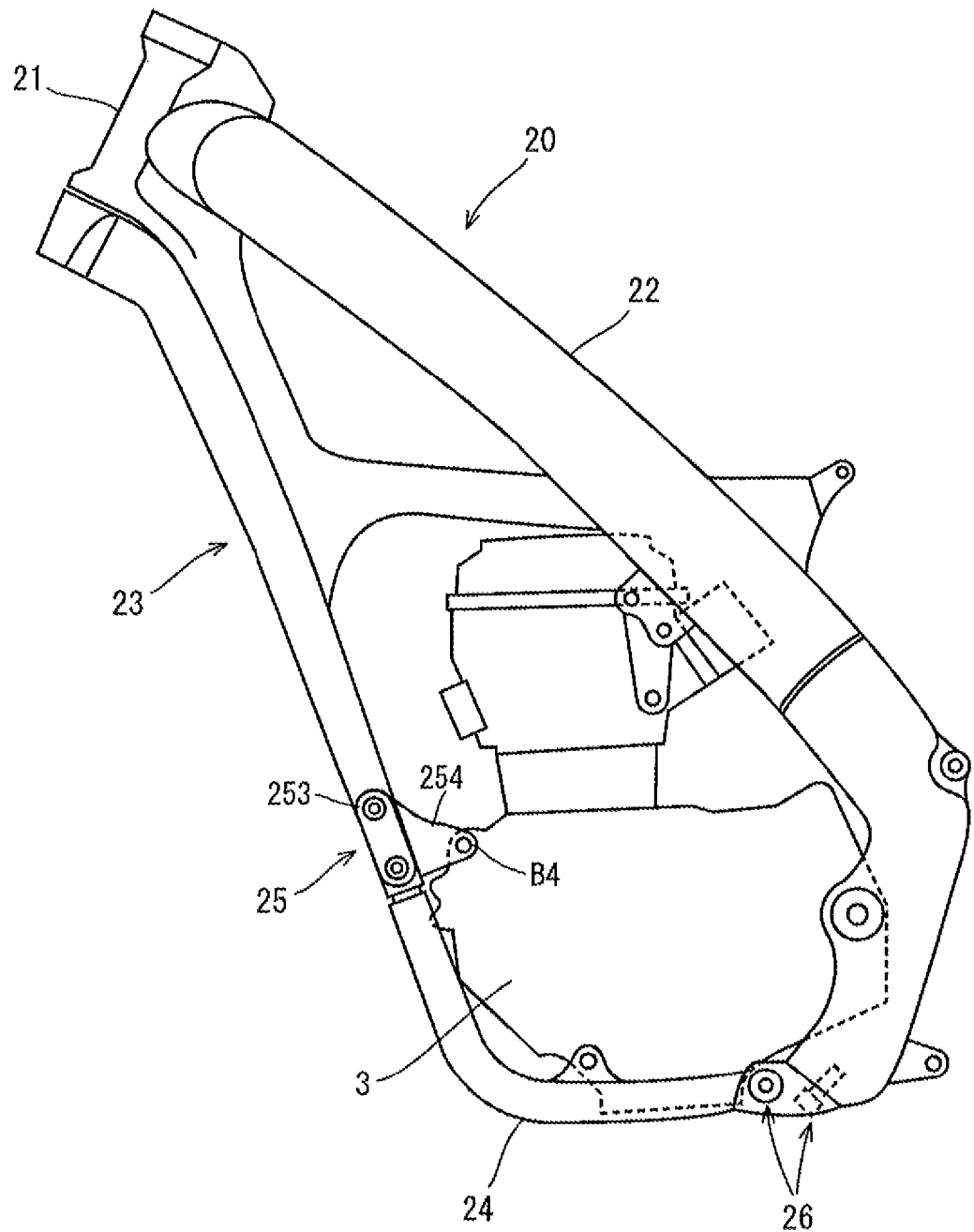
FIG. 5 is a side view of the vehicle body frame and the engine shown in FIG. 1.

After the engine 3 is attached to the upper frame 20, the lower frame 24 is attached to the upper frame 20 as shown in FIG. 5. As described above, the lower frame 24 is fastened to the upper frame 20 by the fastening members 25 and 26. At the time, the lower end of the engine 3 is provided between the pair of lower frames 24. Therefore, the lower frame 24 has a part that overlaps the engine 3 in a side view.

As described above, the vehicle body frame 2 has the part that overlaps the engine 3 in a side view. The vehicle body frame 2 is smaller than an integrally formed vehicle body frame. Therefore, the vehicle body frame 2 can be more lightweight than conventional frames, and the entire vehicle body frame 2 can be placed in the vicinity of the center of gravity of the motorcycle 1. This improves the operational feeling.

Rigidity of Vehicle Body Frame

The rigidity (stiffness) of the vehicle body frame 2 affects operational feeling and riding comfort for a rider. As for a motorcycle such as a motocrosser that travels off-road in particular, the vehicle body frame 2 receives external force in a plurality of directions. At the time, as the fastened portions (front fastened portions and rear fastened portions) have less varying rigidity against various kinds of external force, better operational feeling and riding comfort can be obtained. The fastening members 25 and 26 serve to reduce rigidity unbalance at the fastened portions against various kinds of external force. Now, how the front fastened portions and the rear fastened portions of the vehicle body frame 2 are arranged will be described in detail.

Front Fastened Portions

Arrangement of Upper Frame End 237 and Lower Frame End 241

Figure 6:
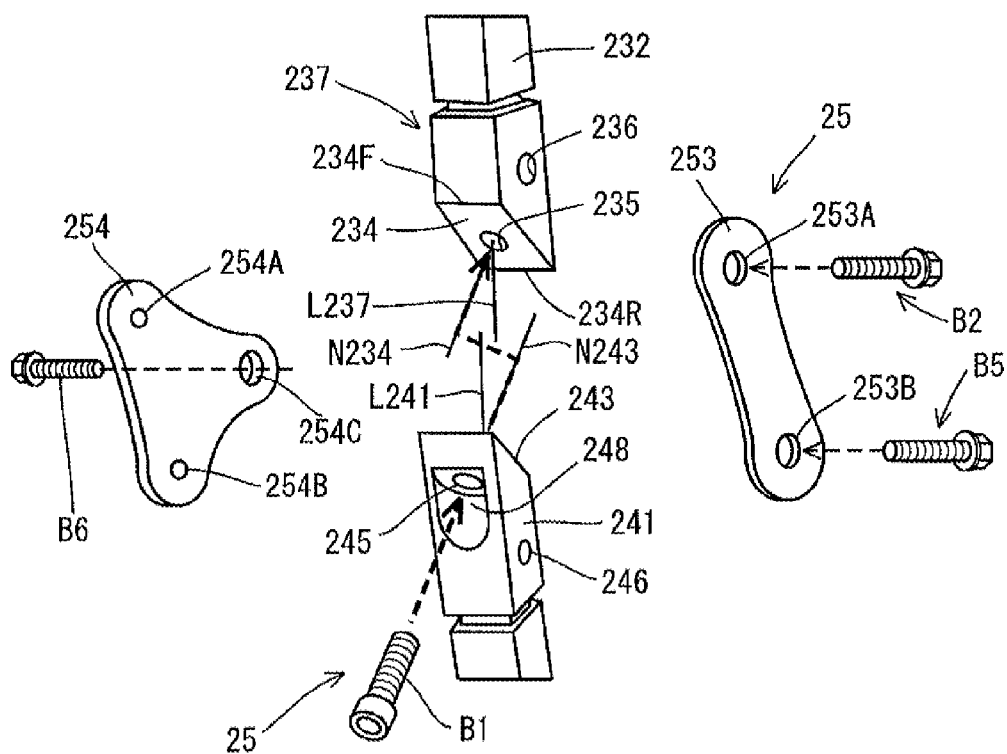
FIG. 6 is an exploded perspective view of a front fastened portion in the vehicle body frame shown in FIG. 2.
Figure 7:
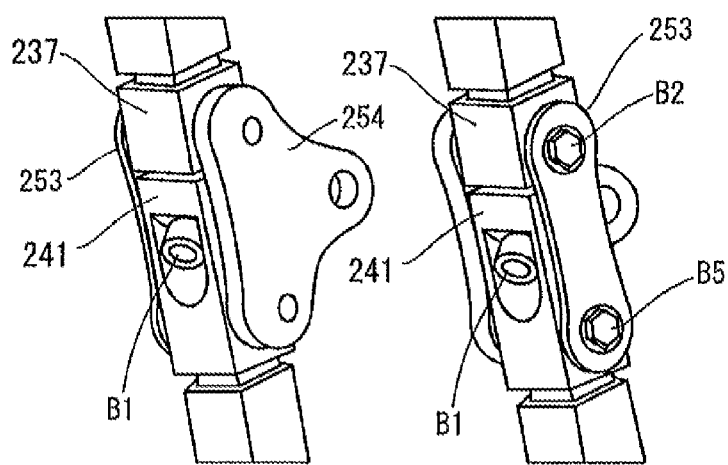
FIG. 7 is a perspective view of the front fastened portion in the vehicle body frame shown in FIG. 2.

FIG. 6 is an exploded perspective view of a front fastened portion in the vehicle body frame 2. FIG. 7 is a perspective view of front fastened portions. Referring to FIG. 6, the upper frame end 237 is provided at a lower end of the branch frame 232. The upper frame end 237 has an end surface 234 at a lower end. The end surface 234 is a plane and inclined with respect to an axial line L237 of the upper frame end 237. A front end 234F of the end surface 234 is provided above a rear end 234R of the end surface 234. Therefore, the normal line N234 to the end surface 234 extends forward and obliquely downward.

The lower frame end 241 is provided at a front end of the lower frame 24. The lower frame end 241 has an end surface 243. The end surface 243 is a plane and inclined with respect to an axial line L241 of the lower frame end 241. A front end of the end surface 243 is provided above a rear end of the end surface 243. Therefore, the normal N243 to the end surface 243 extends backward and obliquely upward.

As shown in FIG. 7, the end surface 243 is in contact with the end surface 234 upon fastening. Therefore, the end surface 234 is opposed to the end surface 243.

The upper frame end 237 further has through holes 235 and 236. The through hole 235 is provided to obliquely cross the axial line L237. More specifically, the through hole 235 is formed between the end surface 234 and a rear surface of the upper frame end 237 and extends in the direction of the normal N234. Therefore, the through hole 235 has an opening each at the end surface 234 and the rear surface of the upper frame end 237. Upon fastening, the axial line L237 is provided coaxially with the axial line L241 of the lower frame end 241. Therefore, upon fastening, the through hole 235 is provided to obliquely cross the axial line L241.

The through hole 236 is provided between the side surfaces of the upper frame end 237. Therefore, the through hole 236 is provided to orthogonally cross the axial line L237 of the upper frame end 237. Therefore, upon fastening, the through hole 236 is also provided to orthogonally cross the axial line L241. The through hole 236 orthogonally cross the through hole 235. An inner surface of the through hole 235 is internally threaded.

Note that the term "orthogonal" herein not only means exact 90 degree intersection but also includes a range of ±10 degrees from 90 degree intersection. The term "orthogonal" preferably refers to a range of ±5 degrees from 90 degrees, more preferably a range of ±2 degrees from 90 degree.

The lower frame end 241 further has two through holes 245 and 246 similarly to the upper frame end 237. The through hole 245 is formed between the end surface 243 and a front surface of the lower frame end 241. A depression 248 is formed at the front surface of the lower frame end 241. The through hole 245 is provided between the end surface 243 and the depression 248. Upon fastening, the through hole 245 is provided coaxially to the through hole 235 and obliquely crosses the axial line L241.

The through hole 246 is provided to orthogonally cross the axial line L241. Therefore, upon fastening, the through hole 246 is parallel to the through hole 236.

Structure of Fastening Member 25

The fastening member 25 includes bolts B1, B2 and B5 and plate type brackets 253 and 254. The bolts B1, B2 and B5 are externally threaded. The bolt B1 is inserted into the through holes 235 and 245 and fastens the lower frame end 241 to the upper frame end 237. Upon fastening, the bolt B1 is provided to obliquely cross the axial line L241. The axial line L241 passes through the bolt B1. In this example, the axial line of the bolt B1 is included in the same virtual plane as the axial line L241.

In the positional relation between the vehicle body frame 2 and the engine 3, if the side where the engine 3 is provided in the vehicle body frame 2 in a side view is defined as "inner side," the bolt B1 is inserted into the through holes 235 and 245 from the outer side to the inner side of the vehicle body frame 2. This makes it easier for an operator to insert the bolt B1 during the manufacture of the motorcycle 1.

The attachment bolt B5 is used to attach the brackets 253 and 254 to the lower frame end 241. The bolt B2 further fastens the brackets 253 and 254 attached to the lower frame end 241 to the upper frame end 237. Therefore, the brackets 253 and 254 are attached to the upper frame end 237 and the lower frame end 241 by the bolt B2 and the attachment bolt B5.

The bracket 253 is provided in contact with a side surface of the upper frame end 237 and a side surface of the lower frame end 241 upon fastening as shown in FIG. 7. Referring to FIG. 6, the bracket 253 has through holes 253A and 253B. The through hole 253A is provided above the through hole 253B. The through hole 253A is provided coaxially with the through hole 236 upon fastening, and the through hole 253B is provided coaxially with the through hole 246.

The bolt B2 is inserted in the through holes 253A and 236 and fastens the bracket 253 to the upper frame end 237. At the time, the bolt B2 is provided to orthogonally cross the axial line L241. The attachment bolt B5 is inserted in the through holes 253B and 246 and attaches the bracket 253 to the lower frame end 241. At the time, the attachment bolt B5 is provided to orthogonally cross the axial line L241. Furthermore, the bolts B2 and B5 are provided to orthogonally cross the bolt B1.

The bracket 254 is provided on a side surface opposite to the side surface where the bracket 253 is provided. The bracket 254 has through holes 254A and 254B. The through hole 254A is provided above the through hole 254B. The through hole 254A is provided coaxially with the through hole 236, and the through hole 254B is provided coaxially with the through hole 246. The through holes 254A and 254B are both internally threaded. The bolt B2 is inserted in the through hole 254A and fastens the bracket 254 to the upper frame end 237. The attachment bolt B5 is inserted in the through hole 254B and attaches the bracket 254 to the lower frame end 241.

The bracket 254 further has a through hole 254C. The through hole 254C is provided behind the through holes 254A and 254B at a rear end of the bracket 254. The fastening member 25 further includes a bolt B6. As shown in FIG. 5, the bolt B4 is inserted in the through hole 254C and fastens the engine 3 to the bracket 254.

As described above, as for the front fastened portions, the bolts B1, B2, and B5 fasten the lower frame end 241 to the upper frame end 237. At the time, the bolt B1 is provided to obliquely cross the axial line L241. The bolts B2 and B5 are provided to orthogonally cross the axial line L241.

As described above, the rigidity of the front fastened portion against force in different directions is unlikely to vary by the function of the bolts B1, B2 and B5 provided in two different directions. The bolt B1 is provided to obliquely cross the axial line L241, and therefore the compression stiffness, tensile rigidity, and bending stiffness of the front fastened portion are improved by the bolt B1. Furthermore, the bolts B2 and B5 are provided to orthogonally cross the axial line L241, and therefore, the torsional rigidity and bending stiffness of the front fastened portion are improved by the bolts B2 and B5. Therefore, the rigidity of the front fastened portion is unlikely to vary against external force applied in different directions. Now, this will be described in detail.

Frame specimens S1 to S4 shown in FIGS. 8 to 11 were examined for their tensile rigidity, compression stiffness, bending stiffness, and torsional rigidity.

Figure 8:
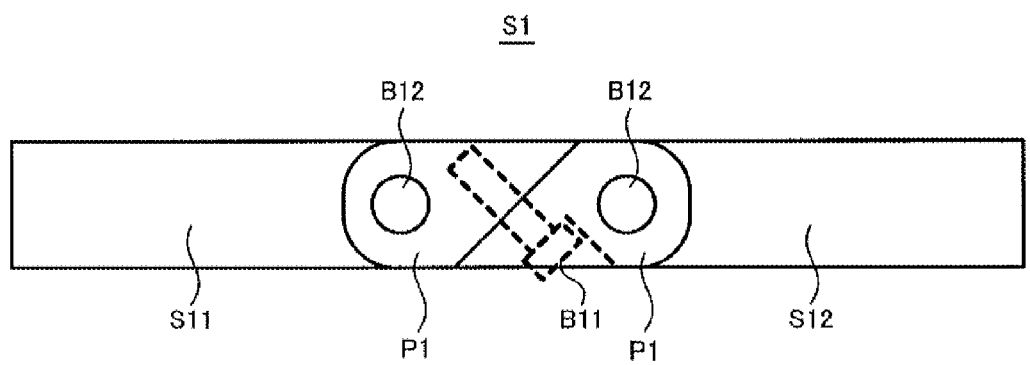
FIG. 8 is a plan view of a frame specimen.

Referring to FIG. 8, the frame specimen S1 had a rectangular cross section and a fastened portion in the center. The frame specimen S1 included frames S11 and S12, and the frames S11 and S12 were fastened in the same manner as that of the front fastened portion in FIG. 7. More specifically, the frames S11 and S12 were coupled by a bolt B11, a pair of bolts B12, and a pair of brackets P1. The bolt B11 was provided to obliquely cross the axial line of the frame specimen S1 and fastened the frame S12 to the frame S11. The pair of bolts B12 secured each of the pair of brackets P1 to one and the other side surfaces of the frames S11 and S12. The pair of bolts B12 was provided to orthogonally cross the axial line of the frame specimen S1.

Figure 9A:
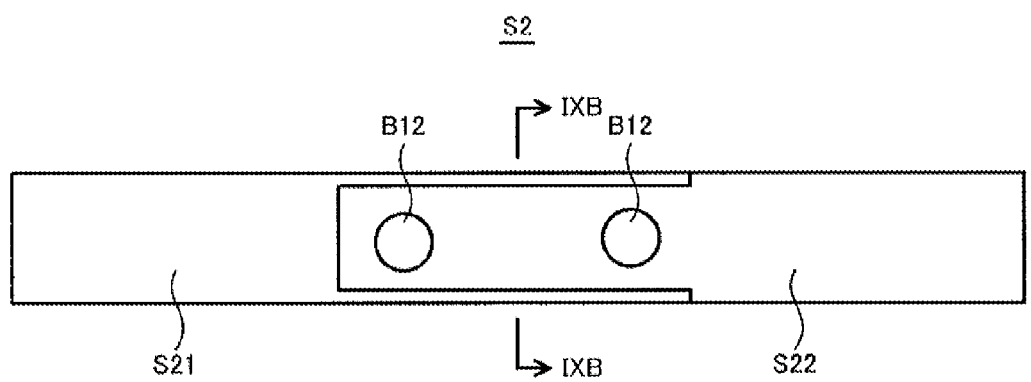
FIG. 9A is a plan view of a frame specimen different from FIG. 8.
Figure 9B:
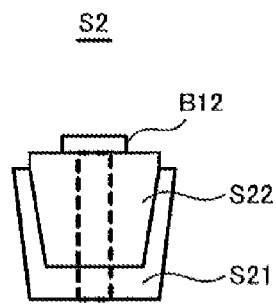
FIG. 9B is a sectional view taken along line IXB-IXB in FIG. 9A.

Referring to FIGS. 9A and 9B, the frame specimen S2 had a cross section whose shape and area were the same as those of the frame specimen S1. The frame specimen S2 had a fastened portion in the center. The frame specimen S2 included frames S21 and S22. As shown in FIG. 9B, a tapered groove was formed at a rear end of the frame S21. A tip end of the frame S22 had a tapered shape so that it was fitted into the groove of the rear end of the frame S21. The tip end of the frame S22 was fitted into the groove of the rear end of the frame S21 and fixed to the rear end of the frame S21 by the pair of bolts B12. The pair of bolts B12 was provided to orthogonally cross the axial direction of the frame specimen S2.

Figure 10A:
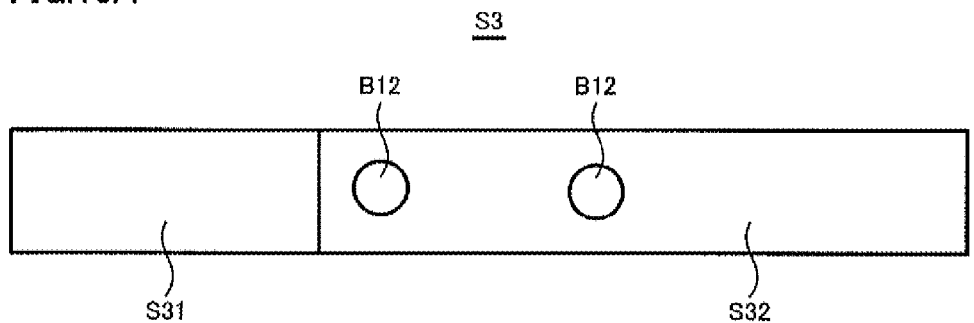
FIG. 10A is a plan view of a frame specimen different from those shown in FIGS. 8 and 9A.
Figure 10B:
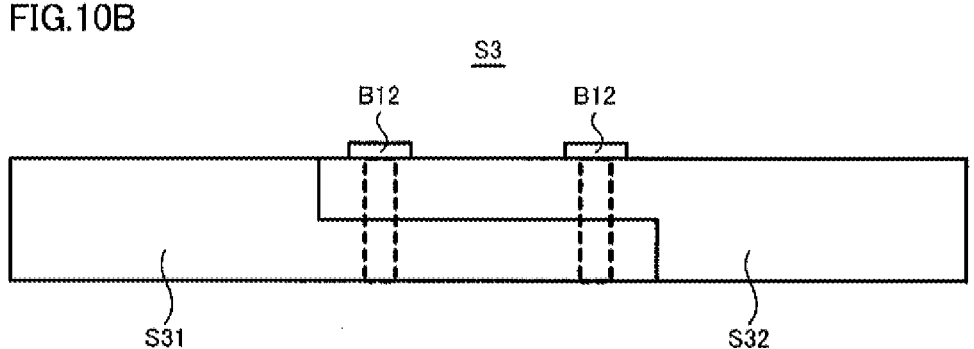
FIG. 10B is a side view of the frame specimen shown in FIG. 10A.

FIG. 10A is a plan view of the frame specimen S3 and FIG. 10B is a side view. Referring to FIGS. 10A and 10B, the frame specimen S3 had a cross section whose shape and area were the same as those of the frame specimen S1. The frame specimen S3 had a fastened portion in the center. The frame specimen S3 included frames S31 and S32. Referring to FIG. 10B, a rear end of the frame S31 had a step and a lower part of the rear end extended behind an upper part. A front end of the frame S32 had a step and an upper end of the front end extended ahead of a lower part. The rear end of the frame S31 is placed on the front end of the frame S32 to form the frame specimen S3. The pair of the bolts B12 was provided in a portion where the rear end of the frame S31 and the front end of the frame S32 are placed on each other and the frames S31 and S32 were fastened by the bolts B12. The bolts B12 were provided to orthogonally cross the axial line of the frame specimen S3.

Figure 11:
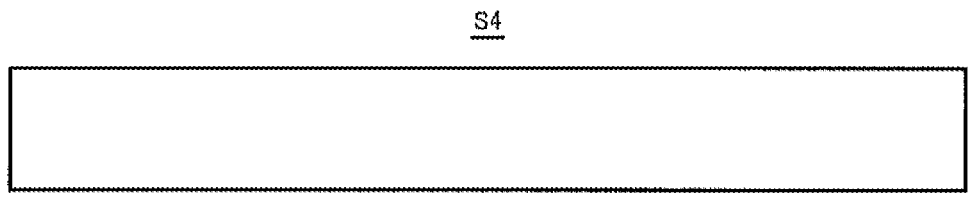
FIG. 11 is a plan view of the frame specimens different from those in FIGS. 8, 9A and 10A.

Referring to FIG. 11, the frame specimen S4 was a tube stock whose cross section had the same shape and area as those of the frame specimen S1 and had no fastened portion.

The frame specimens S1 to S4 all had the same length and outer size.

The frame specimens S1 to S4 were subjected to a tensile test and a compression test with respect to the axial direction of each frame specimen and their tensile rigidity and compression stiffness were obtained. Furthermore, the frame specimens S1 to S3 were subjected to a three point bending test and a cantilever bending test with respect to the axial direction of the bolts B12 and their three point bending stiffness and cantilever bending stiffness were obtained. Furthermore, a three point bending test and a cantilever bending test were carried out in a direction orthogonal to the bolts B12, so that three point bending stiffness and cantilever bending stiffness in the direction orthogonal to the bolts B12 were obtained.

The frame specimen S4 was subjected to a three-point bending test and a cantilever bending test in an arbitrary direction (hereinafter as the "first direction") orthogonal to the axial direction of the frame specimen S4 and bending stiffness with respect to the first direction was obtained. The three-point bending stiffness and cantilever bending stiffness in the first direction were defined as the three-point bending stiffness and cantilever bending stiffness with respect to the lengthwise direction of the bolt B12. A three-point bending test and a cantilever bending test were carried out with respect to a direction (second direction) orthogonal to the axial direction of the frame specimen S4 and the first direction and bending stiffness with respect to the second direction was obtained. The three-point bending stiffness and cantilever bending stiffness in the second direction were defined as three-point bending stiffness and cantilever bending stiffness with respect to the direction orthogonal to the bolt B12. Furthermore, the frame specimens S1 to S4 were each subjected to a torsion test and the torsional rigidity was obtained.

Figure 12:
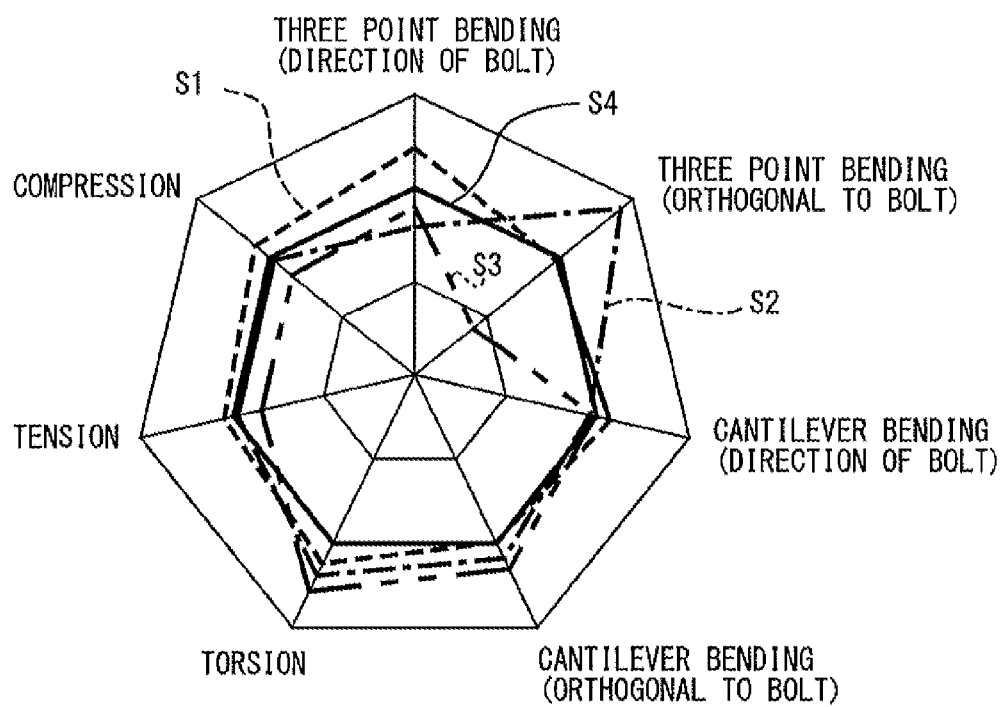
FIG. 12 is a graph showing the ratio of rigidity values against force in different directions obtained for each of the frame specimens in FIGS. 8 to 11 in various rigidity tests using the frame specimens.

Test results for the frame specimens S1 to S4 are given in FIG. 12. FIG. 12 is a graph showing rigidity values obtained from each of the tests for the frame specimens S1 to S4 (compression stiffness, tensile rigidity, the three-point bending stiffness in the lengthwise direction of the bolt B12, the cantilever bending stiffness in the lengthwise direction of the bolt B12, the three-point bending stiffness in the direction orthogonal to the bolt B12, and the cantilever bending stiffness in the direction orthogonal to the bolt B12) when the rigidity (stiffness) of the frame specimen S4 in each test is 100. In FIG. 12, the solid line represents the result for the frame specimen S4. The broken line represents the result for the frame specimen S1. The chain dotted line represents the result for the frame specimen S2. The chain double dotted line represents the result for the frame specimen S3.

Referring to FIG. 12, the rigidity (stiffness) values in the tests for the frame specimen S1 were close to corresponding rigidity values for the frame specimen S4. Therefore, the graph shape for the frame specimen S1 was approximate to a regular heptagon similarly to the frame specimen S4. On the other hand, the frame specimen S2 had a significantly higher stiffness value than the frame specimen S4 in the three-point bending test for the orthogonal direction to the bolt b12. The torsional rigidity value was also high. Therefore, the graph shape for the frame specimen S2 was an irregular shape different from a regular heptagon. The frame specimen S3 had a significantly lower three point bending stiffness value with respect to the orthogonal direction to the bolt B12 than that of the frame specimen S4, and the torsional rigidity value was significantly higher than the frame specimen S4. Furthermore, the tensile rigidity value and the compression stiffness value of the frame specimen S3 were significantly lower than those of the frame specimen S4. Therefore, the graph shape for the frame specimen S3 was an irregular shape different from a regular heptagon.

As can be understood from the test results described above, at the front fastened portion of the vehicle frame S1, rigidity values against external force applied in various different directions are unlikely to be unbalanced and the front fastened portion has similar stiffness to that of a tube stock. Therefore, a rider can maneuver the motorcycle 1 with the same feeling as if an integrally formed vehicle body frame is employed. In other words, the motorcycle 1 can provide improved operational feeling and riding comfort.

In addition, as shown in FIG. 6, the end surface 243 of the lower frame end 241 is inclined with respect to the axial line L241. If the fastened portion between the upper frame member 273 and the lower frame end 241 has a step like the one at the fastened portion at the frame specimens S31 and S32 shown in FIGS. 10A and 10B, a cross section greatly changes at the fastened portion. If the cross section greatly changes, force is not transmitted smoothly across the fastened portion, which degrades the operational feeling. In this example, the end surface 243 is inclined with respect to the axial line L241. Therefore, a cross section of the lower frame end 241 and the upper frame 237 at the fastened portion gradually changes from the tip end. Therefore, stress is smoothly transmitted across the fastened portion, so that the operational feeling is improved.

Furthermore, as shown in FIG. 6, the bolt B1 is inserted in the through hole 245 having an opening at the end surface 243 of the lower frame end 241 and provided in the direction of the normal N243 to the end surface 243. Therefore, the bolt B1 can firmly fasten the end surface 243 to the end surface 234.

Furthermore, the brackets 253 and 254 are attached to the lower frame end 241 by the attachment bolt B5. The bolt B2 then fastens the brackets 253 and 254 attached to the lower frame end 241 to the upper frame end 237. At the time, the attachment bolt B5 extends in the same direction as the bolt B2 and is provided to orthogonally cross the axial line L241. Therefore, the torsional rigidity and the bending stiffness of the fastening members improve.

Furthermore, the engine 3 is attached to the bracket 254. The bracket 254 fastens the upper frame 20, the lower frames 24 and the engine 3 in a single location. In the vehicle body frame, as the number of fastened portions increases, the stiffness becomes more unbalanced. If the engine 3 is not attached to the bracket 254 and is fastened to another bracket provided in another location in the vehicle body frame 2, the number of fastened portions in the vehicle body frame 2 increases. Since the bracket 254 serves to reduce the number of fastened portions in the vehicle body frame 2, unbalance in the stiffness of the vehicle body frame 2 can be reduced and the operational feeling improves.

In this example, the brackets 253 and 254 were used for the front fastened portion. However, one of the brackets 253 and 254 may be used and the other does not have to be used. In such a case, the lower frame end 241 is fastened to the upper frame end 237 by the bolts B2 and the bracket used.

In this example, the bracket 253 or 254 is attached to the lower frame end 241 by the attachment bolt B5. However, the bracket 253 and 254 may be attached to the lower frame end 241 by a method other than using the attachment bolt B5. For example, the brackets 253 and 254 may be welded to a side surface of the lower frame end 241. Alternatively, the brackets 253 and 254 may be formed at the lower frame end 241 by cutting processing.

The brackets 253 and 254 may be attached to a side surface of the upper frame end 237 instead of the lower frame end 241. In this case, the brackets 253 and 254 are fastened to the lower frame end 241 by the attachment bolts B5. In short, a bracket may be attached to one of the upper frame end 237 and the lower frame end 241 and fastened to the other by the bolts.

Details of Rear Fastened Portion

Figure 13:
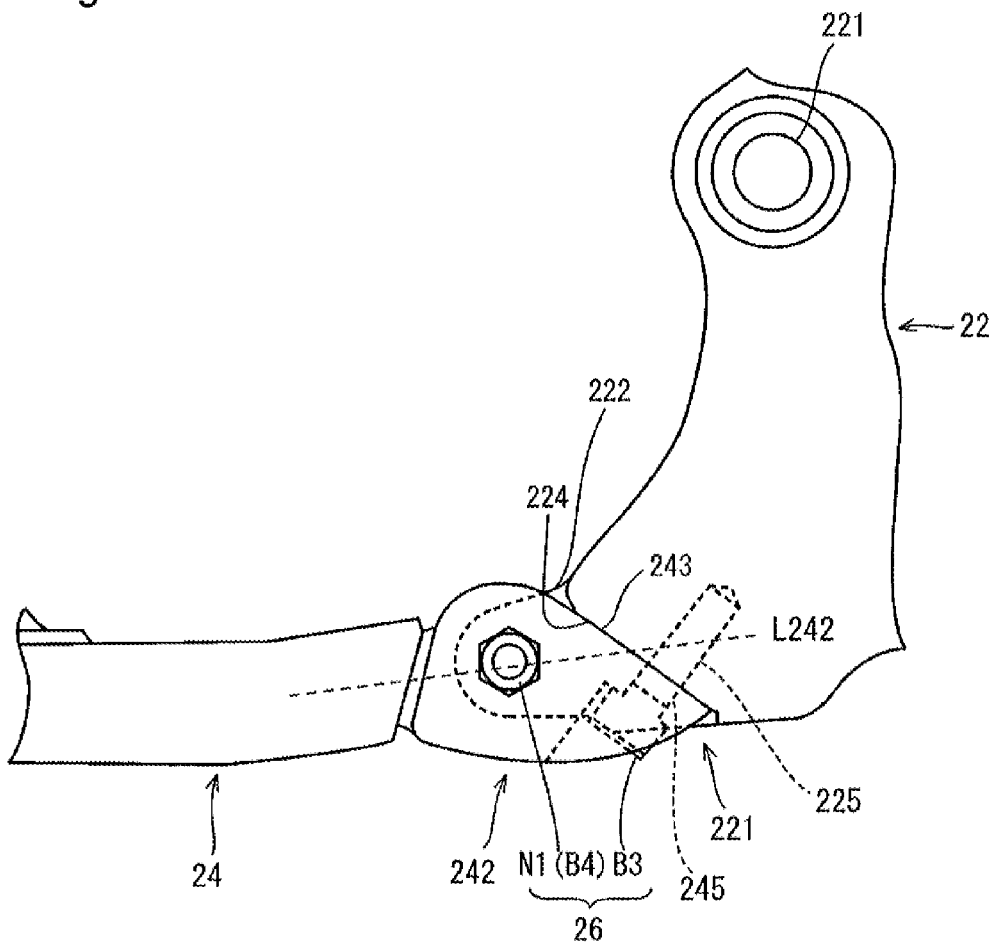
FIG. 13 is a side view of a rear fastened portion in the vehicle body frame shown in FIG. 2.

As for the rear fastened portion, the same method applied to the front fastened portions is employed. FIG. 13 is a side view of a rear fastened portion. Referring to FIG. 13, the rear fastened portion includes the lower frame end 242, the upper frame end 221, and the fastening member 26. The lower frame end 242 is provided at a rear end of the lower frame 24. The upper frame end 221 is provided at a lower end of the main frame 22.

Figure 14:
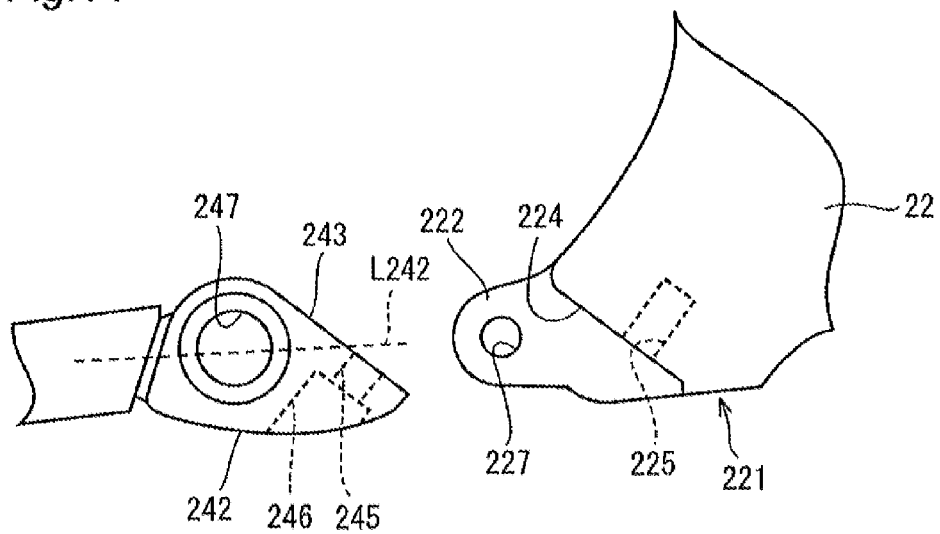
FIG. 14 is a side view of a lower frame end and an upper frame end in FIG. 13.
Figure 15:
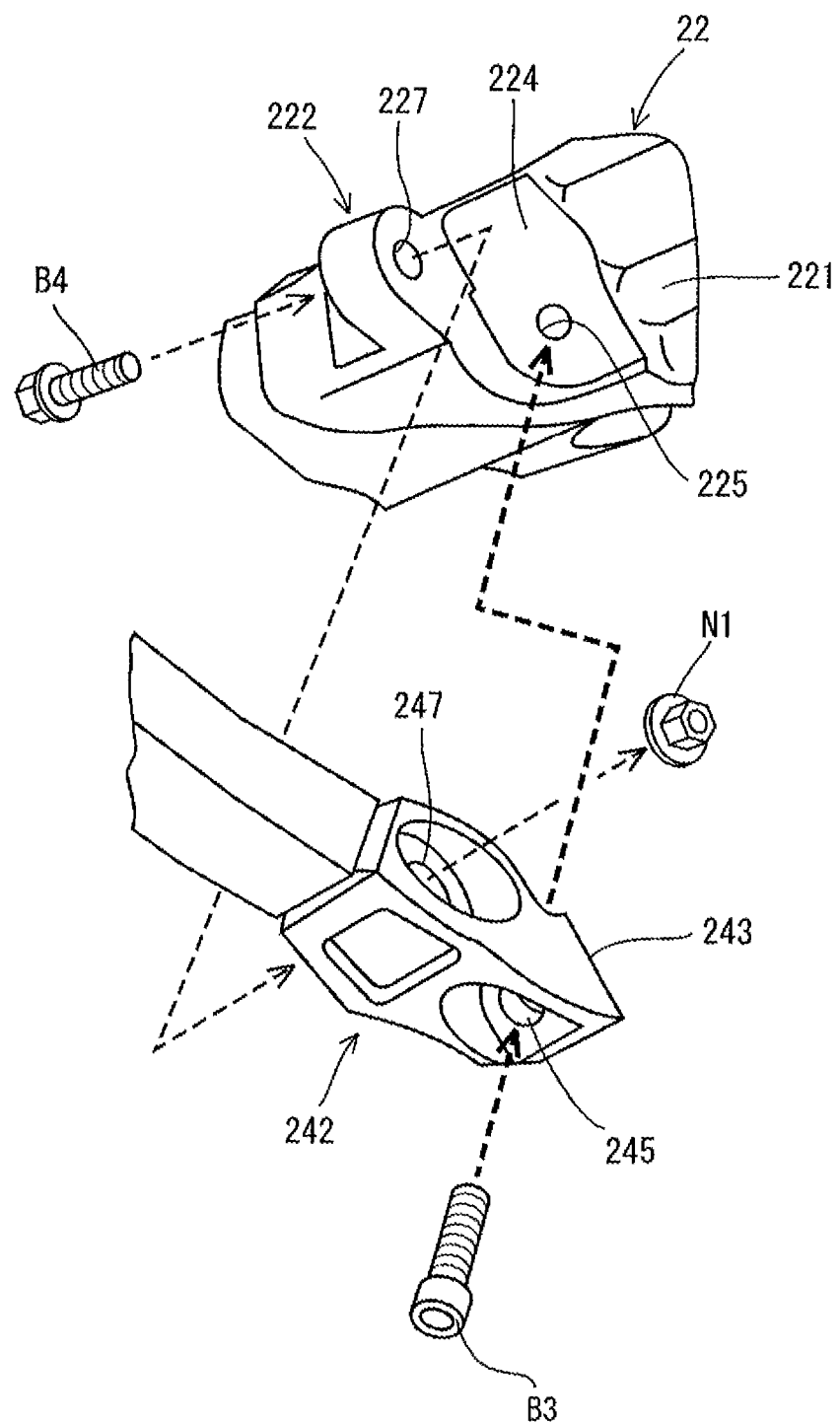
FIG. 15 is an exploded perspective view of the fastened portion shown in FIG. 13.

FIG. 14 is a side view of the lower frame end 242 and the upper frame end 221 in the rear fastened portion. FIG. 15 is an exploded perspective view of the rear fastened portion. Referring to FIGS. 13 to 15, the fastening member 26 includes a bolt B3, a bolt B4, a nut N1, and a bracket 222. The fastening member 26 fastens the lower frame end 242 to the upper frame end 221.

The lower frame end 242 has an end surface 243 at a rear end. The end surface 243 is a plane and inclined with respect to an axial line L242 of the lower frame end 242. The lower end of the end surface 243 is positioned behind the upper end of the end surface 243. The lower frame end 242 has through holes 245 and 247. The through hole 245 is formed between the end surface 243 and a depression 246 formed at a lower surface of the lower frame end 242. Therefore, the through hole 245 has an opening each at the end surface 243 and the surface of the depression 246.

The through hole 247 is formed between the side surfaces of the lower frame end 242 and is provided to orthogonally cross the axial line L242.

The upper frame end 221 has an end surface 224 at a lower end. The end surface 224 is provided opposed to the end surface 243. The upper frame end 221 has a non-penetrating hole 225. The non-penetrating hole 225 extends backward and obliquely upward from the end surface 224. Upon fastening, the non-penetrating hole 225 is provided coaxially with the through hole 245. The inner surface of the non-penetrating hole 225 is internally threaded.

At the lower end of the upper frame end 221, a bracket 222 is attached adjacent to the end surface 224. In this example, the bracket 222 is integrally attached to the lower end of the upper frame end 221. The bracket 222 extends forward and has a through hole 227. Upon fastening, the through hole 227 is provided coaxially with the through hole 247.

The bolt B3 is inserted into the through hole 245 and the non-penetrating hole 225 and fastens the lower frame end 242 to the upper frame end 221. Upon fastening, the bolt B3 is provided obliquely to the axial line L242. The axial line L242 passes through the bolt B3. In this example, the axial line of the bolt B3 and the axial line L242 are included in the same virtual plane.

The bolt B3 is inserted into the through hole 245 and the non-penetrating hole 225 from the outer side to the inner side of the vehicle body frame 2. This makes it easier for an operator to insert the bolt B3 during the manufacture of the motorcycle 1.

The bolt B4 is inserted into the through holes 247 and 227. At the time, the tip end of the bolt B4 protrudes from the through hole 247. The nut N1 is attached to the tip end of the bolt B4 protruding from the through hole 247. The bolt B4 and the nut N1 fasten the upper frame end 242 to the upper frame end 221. The bolt B4 is provided to orthogonally cross the axial line L242.

Using the bolts B3 and B4, unbalanced rigidity at the rear fastened portion against external force in different directions is reduced. Using the bolt B3, the rear fastened portion has improved compression stiffness, tensile rigidity, and bending stiffness. Using the bolt B4, the rear fastened portion has improved torsional rigidity and bending stiffness. This improves operation feeling.

According to the above-described embodiment, as shown in FIG. 5, the main frame 22 has a part that overlaps the engine 3 and the lower frame 24 has a part that overlaps the engine 3 in a side view. However, in the vehicle body frame 2, either the main frame 22 or the lower frame 24 may overlap the engine 3. Even in this case, the vehicle body frame 2 is smaller than the conventional integrally formed vehicle body frame.

According to the above-described embodiment, the vehicle body frame 2 includes the fastening members 25 and 26. However, the vehicle body frame 2 may have one of the fastening members 25 and 26. For example, the vehicle body frame 2 may include the fastening member 25 and another fastening member different from the fastening member 26 may be attached at the rear fastened portion. In this way, stiffness unbalance in the vehicle body frame 2 can be reduced to some extent.

According to the above-described embodiment, the end surfaces 243 and 223 are planes. However, the end surfaces 243 and 223 do not have to be planes.

According to the above-described embodiment, the fastening member 26 includes the nut N1. However, the fastening member 26 does not have to include the nut N1. In this case, the inner surfaces of the through holes 227 and 247 are internally threaded.

According to the above-described embodiment, the bracket 222 is integrally attached to the upper frame end 221. However, the bracket 222 may be attached to the upper frame end 221 by a different method. For example, the bracket 222 may be attached to the upper frame end 221 by an attachment bolt.

Alternatively, the bracket 222 may be attached to the lower frame end 242 instead of the upper frame end 221. In this case, the upper frame end 221 has a side surface in contact with the bracket 222 and the side surface has a hole (that may be either a through hole or non-penetrating hole) provided coaxially with the through hole 227. The bolt B4 is inserted into the through hole 227 and a hole formed in the upper frame end 221 and the lower frame end 242 is fastened to the upper frame end 221.

According to the above-described embodiment, the upper frame 20 includes a pair of main frames 22. However, only one of the main frames 22 may be provided. Only one of the upper frames 24 may be provided. The front frame 23 does not have to have branch frames.

While preferred embodiments of the present invention have been described above, it is to be understood that the embodiments disclosed herein are illustrative and not restrictive. The above-described embodiment can be carried out in various modified forms without departing the scope and spirit of the present invention.

What is claimed is:

1. A motorcycle, comprising:
an engine; and
a vehicle body frame provided around the engine, the vehicle body frame including
an upper frame including a head pipe, a main frame that extends backward and obliquely downward from the head pipe, and a front frame that extends downward from the head pipe, the upper frame having a first upper frame end that is a lower end of the front frame and a second upper frame end that is a lower end of the main frame,
a lower frame provided between the first upper frame end and the second upper frame end, the lower frame including a first lower frame end connected to the first upper frame end and a second lower frame end connected to the second upper frame end, and
a first fastening member fastening a joined upper frame end of the upper frame and a joined lower frame end of the lower frame, the joined upper frame end and the joined lower frame end being one of
the first upper frame end and the first lower frame end respectively, and
the second upper frame end and the second lower frame end respectively,
the first fastening member including
a first bolt provided to obliquely cross a first axial line of the joined lower frame end, and to fasten the joined lower frame end to the joined upper frame end, and
a second bolt provided to orthogonally cross the first axial line and to fasten the joined lower frame end to the joined upper frame end.

2. The motorcycle according to claim 1, wherein the first axial line passes through the first bolt.

3. The motorcycle according to claim 2, wherein the first bolt orthogonally crosses the second bolt.

4. The motorcycle according to claim 3, wherein the first fastening member further comprises a bracket attached to one of the joined upper frame end and the joined lower frame end, and
the second bolt fastens the bracket to the other one of the joined upper frame end and the joined lower frame end.

5. The motorcycle according to claim 4, wherein an end surface of the joined lower frame end is inclined with respect to the first axial line, and
an end surface of the joined upper frame end is opposed to the end surface of the joined lower frame end.

6. The motorcycle according to claim 5, wherein the first bolt is inserted into a hole having an opening at the end surface of the joined lower frame end, and the first bolt is disposed in a direction normal to the end surface of the joined lower frame end.

7. The motorcycle according to claim 6, wherein in a side view of the motorcycle, the vehicle body frame has an inner side that is closer to the engine than an outer side of the vehicle body frame, the inner side being where the engine is provided, further wherein the first bolt is inserted to the inner side of the vehicle body frame from the outer side of the vehicle body frame.

8. The motorcycle according to claim 4, wherein the first fastening member further comprises an attachment bolt used to attach the bracket to the one of the joined upper frame end and the joined lower frame end, and further wherein the attachment bolt extends in a same direction as the second bolt.

9. The motorcycle according to claim 4, wherein the engine is attached to the bracket.

10. The motorcycle according to claim 1, wherein the joined upper frame end and the joined lower frame end are the first upper frame end and the first lower frame end respectively, the motorcycle further comprises a second fastening member that fastens the second lower frame end to the second upper frame end, the second fastening member comprising a third bolt provided to obliquely cross a second axial line of the second lower frame end to fasten the second lower frame end to the second upper frame end, and a fourth bolt provided to orthogonally cross the second axial line to fasten the second lower frame end to the second upper frame end.

11. The motorcycle according to claim 10, further comprising:

a rear shock absorber; and a link mechanism coupled to a lower end of the rear shock absorber, wherein the main frame includes a pair of main frames and the second upper frame end includes a pair of second upper frame ends that correspond to the main frames respectively, and an attachment member is provided between the pair of second upper frame ends and is coupled with the link mechanism.

12. The motorcycle according to claim 1, wherein the main frame has a pair of main frames, and the pair of main frames has a part that overlaps the engine in a side view of the motorcycle.

13. The motorcycle according to claim 1, wherein the lower frame has a pair of lower frames, and the pair of lower frames has a part that overlaps the engine in a side view.

14. A vehicle body frame provided around an engine for use in a motorcycle, comprising:

an upper frame including a head pipe, a main frame that extends backward and obliquely downward from the head pipe, and a front frame that extends downward from the head pipe, wherein the upper frame has a first upper frame end that is a lower end of the front frame and a second upper frame end that is a lower end of the main frame;

a lower frame provided between the first upper frame end and the second upper frame end, wherein the lower frame includes a first lower frame end connected to the first upper frame end and a second lower frame end connected to the second upper frame end; and a fastening member that fastens a joined upper frame end of the upper frame and a joined lower frame end of the lower frame, the joined upper frame end and the joined lower frame end being one of the first upper frame end and the first lower frame end respectively, and the second upper frame end and the second lower frame end respectively, the fastening member including a first bolt provided to obliquely cross an axial line of the joined lower frame end and to fasten the joined lower frame end to the joined upper frame end, and a second bolt provided to orthogonally cross said axial line to fasten the joined lower frame end to the joined upper frame end.

15. The vehicle body frame according to claim 14, wherein the axial line passes through the first bolt.

16. The vehicle body frame according to claim 15, wherein the first bolt orthogonally crosses the second bolt.

17. The vehicle body frame according to claim 16, wherein the fastening member further comprises a bracket attached to one of the joined upper frame end and the joined lower frame end, and the second bolt fastens the bracket to the other one of the joined upper frame end and the joined lower frame end.

18. The vehicle body frame according to claim 17, wherein the fastening member further comprises an attachment bolt used to attach the bracket to the one of the joined upper frame end and the joined lower frame end, and further wherein the attachment bolt extends in a same direction as the second bolt.

* * * * *